(12) United States Patent
Jamison

(10) Patent No.: US 11,729,228 B2
(45) Date of Patent: Aug. 15, 2023

(54) SYSTEMS AND METHODS FOR SHARING CONTENT EXTERNALLY FROM A GROUP-BASED COMMUNICATION PLATFORM

(71) Applicant: Slack Technologies, LLC, San Francisco, CA (US)

(72) Inventor: Britton Jamison, San Francisco, CA (US)

(73) Assignee: SLACK TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 17/131,253

(22) Filed: Dec. 22, 2020

(65) Prior Publication Data

US 2022/0201049 A1    Jun. 23, 2022

(51) Int. Cl.
| | |
|---|---|
| *G06F 3/06* | (2006.01) |
| *G06F 3/0484* | (2022.01) |
| *H04L 29/06* | (2006.01) |
| *H04L 65/403* | (2022.01) |
| *G06F 3/04842* | (2022.01) |
| *G06F 3/0481* | (2022.01) |
| *H04L 67/02* | (2022.01) |

(52) U.S. Cl.
CPC .......... *H04L 65/403* (2013.01); *G06F 3/0481* (2013.01); *G06F 3/04842* (2013.01); *H04L 67/02* (2013.01)

(58) Field of Classification Search
CPC ..... H04L 65/403; H04L 67/02; G06F 3/0481; G06F 3/04842
See application file for complete search history.

(56) References Cited

U.S. PATENT DOCUMENTS

2008/0104408 A1* 5/2008 Mayer ................ H04N 1/32112
                                              713/178
2012/0197980 A1* 8/2012 Terleski ................ G06Q 50/01
                                              709/203

(Continued)

OTHER PUBLICATIONS

"Die, Email, Die! A Flickr Cofounder Aims To Cut Us All Some Slack", Readwriteweb, Lexisnexis, www.advance.lexis.com/api/permalink/33dd79e2-90f5-409d-ae27-5a2c7e86bf31/?context=1000516. (dated Aug. 14, 2013, 4:15 PM) 2 pages.

(Continued)

*Primary Examiner* — Jennifer N Welch
*Assistant Examiner* — Parmanand D Patel
(74) *Attorney, Agent, or Firm* — Holland & Hart LLP

(57) ABSTRACT

A computer-implemented method includes displaying first content within an interface of a group-based communication channel of a group-based communication platform on a first user device associated with a member of the group-based communication channel; receiving a request from the first user device to share the first content outside of the group-based communication platform; in response to the request from the first user device, generating a link to the first content for sharing outside of the group-based communication platform; receiving a request to view the first content from a second user device, wherein the request to view the first content originated outside of the group-based communication platform and is associated with the link; and displaying the first content on the second user device.

17 Claims, 9 Drawing Sheets

(56) References Cited

U.S. PATENT DOCUMENTS

| | | | | |
|---|---|---|---|---|
| 2015/0134808 | A1* | 5/2015 | Fushman | G06Q 30/02 |
| | | | | 709/224 |
| 2016/0021115 | A1* | 1/2016 | Adams | H04L 63/102 |
| | | | | 726/6 |
| 2017/0118259 | A1* | 4/2017 | Wadhwa | G06F 3/04842 |
| 2018/0287982 | A1 | 10/2018 | Draeger et al. | |
| 2018/0343261 | A1* | 11/2018 | Lopez-Uricoechea | |
| | | | | H04L 67/1097 |
| 2019/0073213 | A1* | 3/2019 | Dong | G06Q 50/01 |
| 2019/0387034 | A1* | 12/2019 | Archer, III | H04L 51/18 |

OTHER PUBLICATIONS

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email", Atlantic Online, Lexisnexis, www.advance.lexis.com/api/permalink/32d7ddd9-d4c1-4a73-86f7-08ab5842fde6/?context=1000516, (dated Jan 6, 2016) 5 pages.

David Auerbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.

Ernie Smith, "Picking Up The Slack", Tedium, [online][retrieved May 9, 2019]. Retrieved from the Internet: www.tedium.co/2017/10/17/irc-vs-slack-chat-history/. (dated Oct. 17, 2017) 13 pages.

Internet Relay Chat, Wikipedia, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", GIGAOM, Lexisnexis, www.advance.lexis.com/api/permalink/e83778c8-09c8-43aa-9ba0-88526283de69/?context=1000516, dated Aug. 1, 2014, 5:45 PM) 4 pages.

Matsumoto, T. et al., "Chocoa Communicator—A New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, www.advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, is Valued at $1.1 Billion", The New York Times Blogs (BITS), Lexisnexis, www.advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: www.rfc-editor.org/rfc/rfc1459.txt. (dated May 1993) 57 pages.

Rebecca Walberg, "Email biggest office waste of time: survey", National Post, At FP10, Lexisnexis, www.advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became a $2.8 Billion Unicorn", Forbes, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

* cited by examiner

SYSTEMS AND METHODS FOR SHARING CONTENT EXTERNALLY FROM A GROUP-BASED COMMUNICATION PLATFORM

FIELD

The present disclosure relates generally to sharing content in a group-based communication system, and more specifically to sharing content outside of the group-based communication system.

BACKGROUND

Communication platforms facilitate sharing of content between users. Some communication platforms define closed communication groups in which members of the group can exchange content with one another that is inaccessible to users who are not members of the group. This can enable content to be quickly and easily shared among the members of a group while ensuring that content is not shared too widely. In some cases, a group member may desire to share content posted to a group outside of the group. However, the closed membership of the group may make sharing of content outside of the group difficult or cumbersome.

SUMMARY

According to various embodiments, a group-based communication platform facilitates the sharing of content that has been shared within a group-based communication channel externally, outside of the channel by providing a shareable link to the content that can be used by users without access to the channel to access the content. A member of a channel may request a shareable link to content posted to the channel, content such as one or more messages, video or audio clips, documents, images, etc. In response to the request, the group-based communication platform may generate a shareable link that the channel member may share externally, such by posting the link to a third-party platform, emailing the link to an external user, etc. A recipient of the link may use the link to access the linked content. For example, the user may click the link and a request may be provided to the group-based communication platform for accessing the linked content. In response to receiving the request, the group-based communication platform may provide the linked content to the requesting user without granting access to other content posted to the channel. Thus, channel members can quickly and easily share content posted to the group externally while continuing maintain access restrictions to other content posted in the channel. According to various embodiments, this not only provides platform users with enhanced communication capability, it may increase exposure to the platform to users who may not be familiar with the platform, which can increase platform adoption.

According to some embodiments, a computer-implemented method includes displaying first content within an interface of a group-based communication channel of a group-based communication platform on a first user device associated with a member of the group-based communication channel, receiving a request from the first user device to share the first content outside of the group-based communication platform, in response to the request from the first user device, generating a link to the first content for sharing outside of the group-based communication platform, receiving a request to view the first content from a second user device, wherein the request to view the first content originated outside of the group-based communication platform and is associated with the link, and displaying the first content on the second user device.

In any of these embodiments, the request to view the first content from the second user device may be associated with a non-member of the group-based communication channel.

In any of these embodiments, the second user device may be associated with a second user that is a member of the group-based communication platform, the first content may be displayed in a group-based communication platform interface for the second user, and the second user may be added to the group-based communication channel.

In any of these embodiments, at least a portion of the first content may be displayed within an application that is external to the group-based communication platform.

In any of these embodiments, the method may further include, in response to receiving the request to view the first content from the second user device and prior to displaying the first content on the second user device, requesting approval from an administrator of the group-based communication channel.

In any of these embodiments, the method may further include receiving a request from the second user device to interact with the first content and, in response to receiving the request to interact with the first content, displaying an authentication prompt for a user associated with the second user device to authenticate.

In any of these embodiments, the request to view the first content may include information indicating a source of the request and the method further comprises determining whether to display the first content on the second user device based on the information indicating the source.

In any of these embodiments, the information may include at least one of a domain, a geographic location, or a software application.

According to some embodiments, a group-based communication system includes one or more processors, memory, and one or more programs stored in the memory and configured to be executed by the one or more processors, wherein the one or more programs include instructions for: displaying first content within an interface of a group-based communication channel of a group-based communication platform on a first user device associated with a member of the group-based communication channel; receiving a request from the first user device to share the first content outside of the group-based communication platform; in response to the request from the first user device, generating a link to the first content for sharing outside of the group-based communication platform; receiving a request to view the first content from a second user device, wherein the request to view the first content originated outside of the group-based communication platform and is associated with the link; and displaying the first content on the second user device.

In any of these embodiments, the request to view the first content from the second user device may be associated with a non-member of the group-based communication channel.

In any of these embodiments, the second user device may be associated with a second user that is a member of the group-based communication platform, the first content may be displayed in a group-based communication platform interface for the second user, and the second user may be added to the group-based communication channel.

In any of these embodiments, at least a portion of the first content may be displayed within an application that is external to the group-based communication platform.

In any of these embodiments, the one or more programs may include instructions for: in response to receiving the request to view the first content from the second user device and prior to displaying the first content on the second user device, requesting approval from an administrator of the group-based communication channel.

In any of these embodiments, the one or more programs may include instructions for: receiving a request from the second user device to interact with the first content and, in response to receiving the request to interact with the first content, displaying an authentication prompt for a user associated with the second user device to authenticate.

In any of these embodiments, the request to view the first content may include information indicating a source of the request and the one or more programs may include instructions for determining whether to display the first content on the second user device based on the information indicating the source.

In any of these embodiments, the information may include at least one of a domain, a geographic location, or a software application.

According to some embodiments, a non-transitory computer-readable storage medium stores one or more programs, the one or more programs comprising instructions, which when executed by one or more processors of a computing system, cause the computing system to: display first content within an interface of a group-based communication channel of a group-based communication platform on a first user device associated with a member of the group-based communication channel; receive a request from the first user device to share the first content outside of the group-based communication platform; in response to the request from the first user device, generate a link to the first content for sharing outside of the group-based communication platform; receive a request to view the first content from a second user device, wherein the request to view the first content originated outside of the group-based communication platform and is associated with the link; and display the first content on the second user device.

In any of these embodiments, the request to view the first content from the second user device may be associated with a non-member of the group-based communication channel.

In any of these embodiments, the second user device may be associated with a second user that is a member of the group-based communication platform, the first content may be displayed in a group-based communication platform interface for the second user, and the second user may be added to the group-based communication channel.

In any of these embodiments, at least a portion of the first content may be displayed within an application that is external to the group-based communication platform.

In any of these embodiments, the one or more programs may include instructions for: in response to receiving the request to view the first content from the second user device and prior to displaying the first content on the second user device, requesting approval from an administrator of the group-based communication channel.

In any of these embodiments, the one or more programs may include instructions for: receiving a request from the second user device to interact with the first content and, in response to receiving the request to interact with the first content, displaying an authentication prompt for a user associated with the second user device to authenticate.

In any of these embodiments, the request to view the first content may include information indicating a source of the request and the one or more programs may include instructions for determining whether to display the first content on the second user device based on the information indicating the source.

In any of these embodiments, the information may include at least one of a domain, a geographic location, or a software application.

BRIEF DESCRIPTION OF THE DRAWINGS

The invention will now be described, by way of example only, with reference to the accompanying drawings, in which.

DETAILED DESCRIPTION

Figure 1:
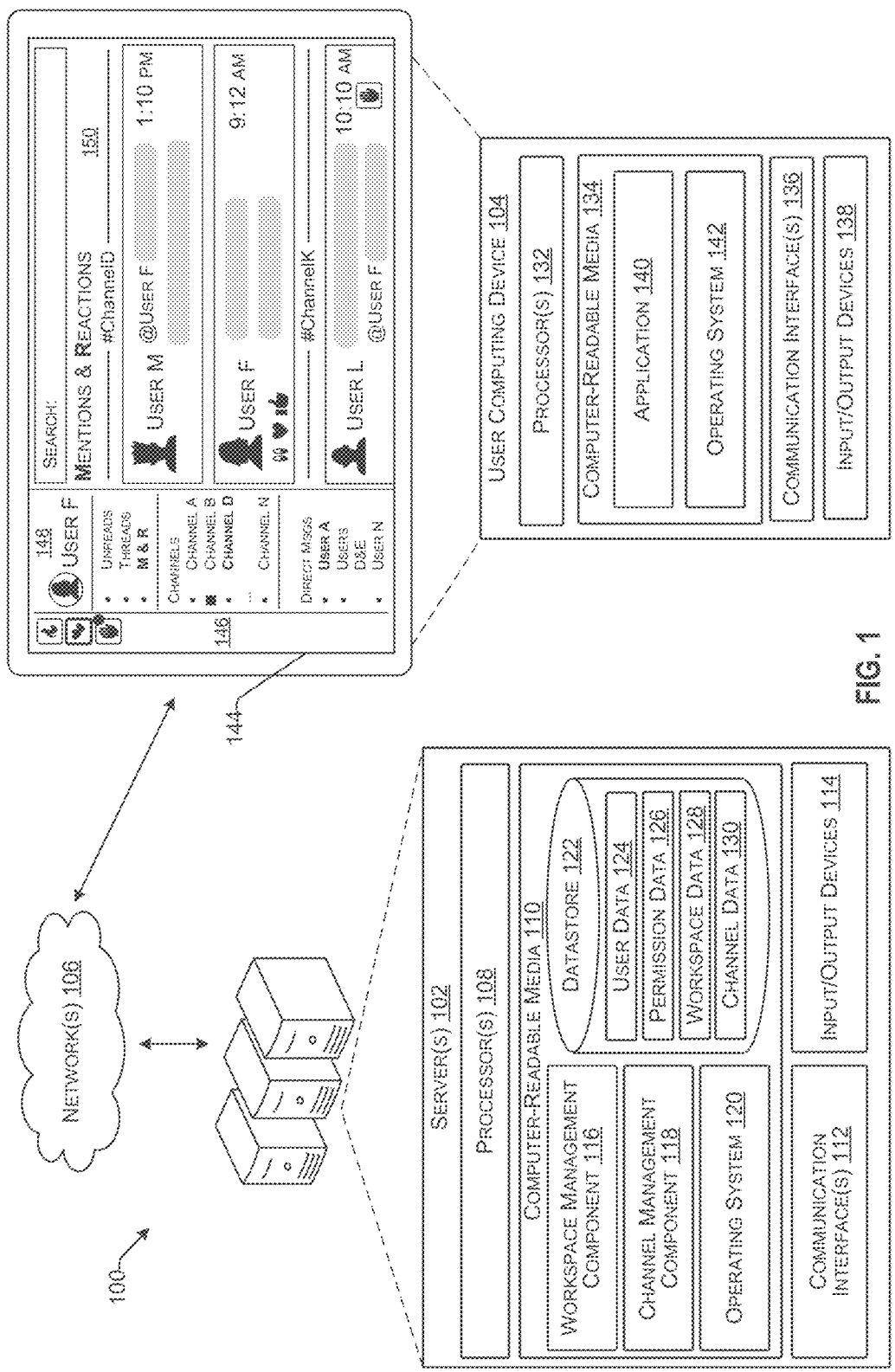
FIG. 1 illustrates an example environment for displaying messages and reactions within a group-based communication platform, according to various embodiments.

According to various embodiments, a group-based communication platform enables group members to share content outside of their group by providing a shareable link that can be used by non-group members to access the content. Thus, content that is shared in groups where only members have access to the group can be conveniently shared with those who are not members of the group. This can enable the shared content to be distributed more widely. In some embodiments, the shareable link can be used outside of the group-based communication platform and can introduce the platform to potential new users, increasing the platform's adoption. In some embodiments, the group is a communication channel and members that have access to the channel can share content posted in the channel externally of the group-based communication platform.

According to various embodiments, a member of a group of a group-based communication platform may request to share content posted within a group of a group-based communication platform externally to the group and may be provided with a link to do so. The user may distribute the link outside of the group for non-group members to access the content without having to join the group. In some embodiments, the content can be shared externally to the platform for non-platform users to access the content without having to join the platform and/or group. The link can be shared in any suitable manner, such as by emailing the link, posting the link to social media, etc.

According to various embodiments, selection of the link by an external user (external to the group and/or external to the platform) may result in a request to the group-based communication server to access the content. In response to the request, the group-based communication server may determine access to the content based on a source of the request. For example, a request from within the group-based communication platform may be handled in one manner and a request from outside of the group-based communication platform may be handled in another manner. In some embodiments, requests from outside of the platform may be handled differently (e.g., denied altogether or provided with a different access workflow or user interface) based on one or more aspects of the source of the request, such as domain, requesting application, or geographic region. In some embodiments, handling of requests for content may be based on configurable parameters (e.g., configurable by a group administrator) associated with the group from which the shareable link originated.

In the following description of the various embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a workspace management component 116, a channel management component 118, an operating system 120, and a datastore 122.

In at least one example, the workspace management component 116 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 116 can manage workspace membership. That is, the workspace management component 116 can receive requests to associate users with individual workspaces and the workspace management component 116 can associate user accounts associated with such users with group identifiers associated with the individual workspaces. For example, responsive to receiving a request to add a user to a workspace, the workspace management component 116 can associate a user account of the user with a group identifier of the workspace. The workspace management component 116 can disassociate user accounts and group identifiers, for example, when a user is removed from a workspace.

In at least one example, the workspace management component 116 can manage cross-workspace data integration, as described herein. For example, the workspace management component 116 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 116 can detect updates to data associated with a workspace and can integrate such updated data into user interface(s) presented via user computing device(s) of user(s) associated with the workspace. Similarly, the workspace management component 116 can facilitate cross-workspace operations. For example, the workspace management component 116 can facilitate messages between workspaces, searches between or across multiple workspaces, and the like. Additional details of operations that can be performed by the workspace management component 116 are described below.

In at least one example, the channel management component 118 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 118 can establish a communication channel between and among various user computing devices, allowing the user computing devices to communicate and share data between and among each other. In at least one example, the channel management component 118 can manage such communications and/or sharing of data. In some examples, data associated with a communication channel can be presented via a user interface. In at least one example, the channel management component 118 can interact with the workspace management component 116 to manage the generation, presentation, and/or updating of user interfaces. Additional details of operations that can be performed by the channel management component 118 are described below.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise multiple databases, which can include user data 124, permission data 126, workspace data 128, and channel data 130. Additional or alternative data may be stored in the data store and/or one or more other data stores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the workspace data 128 can store data associated with individual workspaces. As described above, the communication platform can be partitioned into workspaces associated with groups of users. In at least one example, a group identifier can be associated with a workspace. In at least one example, the group identifier can indicate a physical address in the workspace data 128 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 122 (e.g., the user data 124, the permission data 126, the channel data 130, etc.).

In at least one example, the channel data 130 can store data associated with individual communication channels. In at least one example, the channel management component 118 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input.

A non-limiting example of a user interface 144 is shown in FIG. 1. As illustrated in FIG. 1, the user interface 144 can present data associated with one or more communication channels and, in some examples, one or more workspaces. That is, in some examples, the user interface can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 144 can include a first region 146, or pane, that includes indicator(s) (e.g., user interface element(s) or object(s)) associated with workspace(s) with which the user (e.g., account of the user) is associated. In some examples, the user interface 144 can include a second region 148, or pane, that includes indicator(s) (e.g., user interface element(s) or object(s)) representing data associated with the workspace(s) with which the user (e.g., account of the user) is associated. Additional details associated with the second region 148 and indicator(s) are described below with reference to FIG. 2.

In at least one example, the user interface 144 can include a third region 150, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 150 can be associated with the same or different workspaces. That is, in some examples, the third region 150 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 150 presents data associated with multiple workspaces, at least some data can be associated with an indication of which workspace the data is associated with. Additional details associated with the user interface 144, and the third region 150, are described below with reference to FIG. 2.

In at least one example, the operating system 142 can manage the processor(s) 132, computer-readable media 134, hardware, software, etc. of the server(s) 102.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the workspace management component 116, the channel management component 118, and the application 140, techniques described herein can be performed by any other component, or combination of components, which can be associated with the server(s) 102, the user computing device 104, or a combination thereof.

Figure 2:
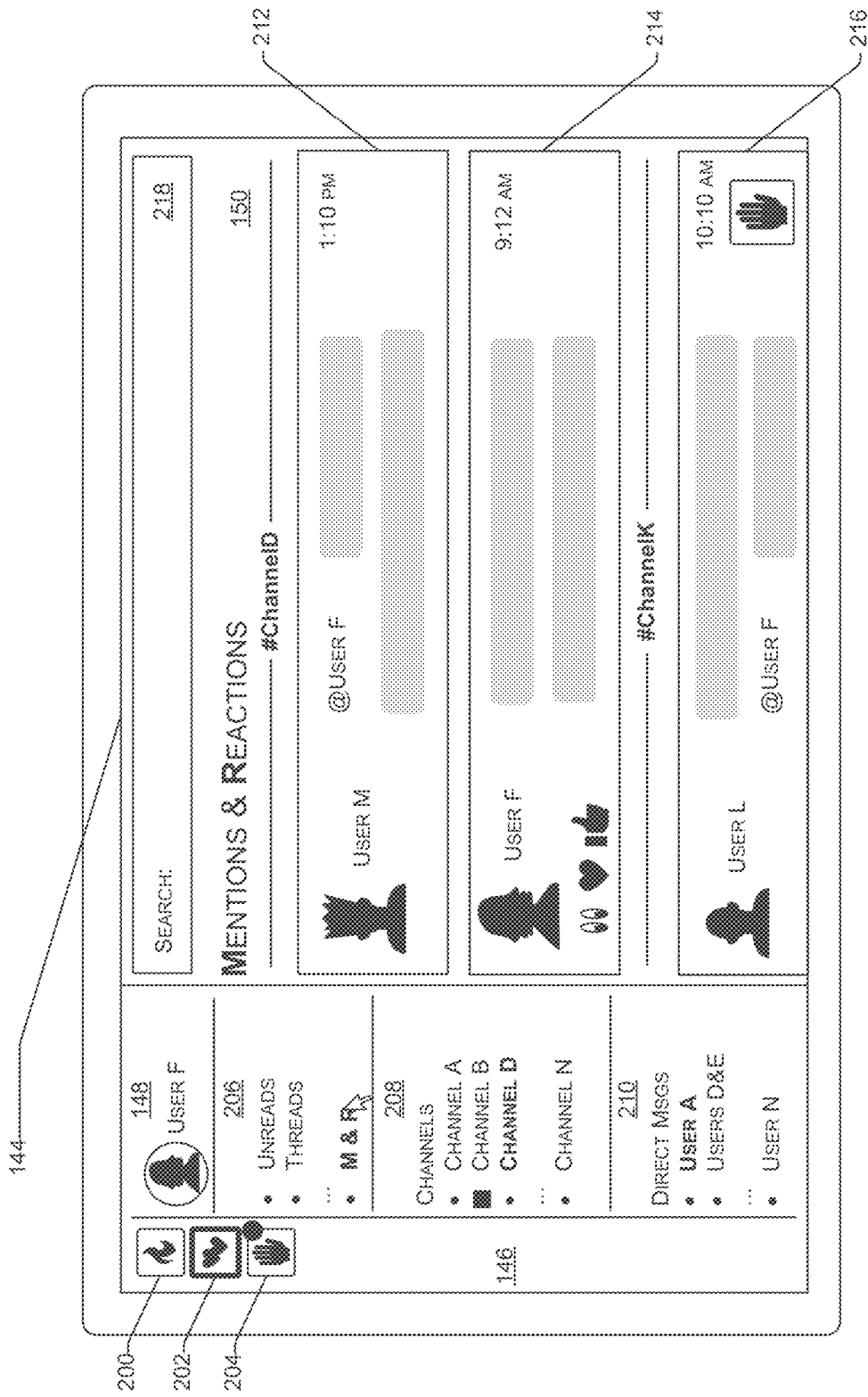
FIG. 2 illustrates aspects of a user interface, according to various embodiments.

FIG. 2 illustrates additional details associated with the user interface 144 that presents data associated with multiple workspaces, as described above with reference to FIG. 1.

As described above, in at least one example, the user interface 144 can include a first region 146, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 146. In at least one example, a user account of the user (e.g., User F) can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 146. In some examples, some of the indicators associated with all of the workspaces with which a user is associated can be presented via the first region 146 and the user can interact with the user interface 144 to view additional or alternative indicators. In examples where fewer than all workspaces are represented via the user interface 144, the indicators can be arranged in alphabetical order, in an order of most recent interaction, in an order based on most frequent interaction, or some other order.

In some examples, the first region 146 may not be included in the user interface 144, and such information can be integrated into the user interface 144 via additional or alternative mechanisms.

In some examples, the user interface 144 can include a second region 148, or pane, that includes indicator(s) (e.g., user interface element(s) or object(s)) representing virtual space(s) associated with the workspace(s) with which the user (e.g., account of the user) is associated. In at least one example, the second region 148 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism such that when actuated, can cause the application 140 to present data associated with the corresponding virtual space via the third region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 150, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second region 148 of the user interface 144 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 144 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 144. In some examples, communication channels associated with different workspaces can be in different sections of the second sub-section 208, or can have their own regions or panes in the user interface 144.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 144. In such examples, the user may navigate to a different interface (not shown) to browse additional channels that are accessible to the user but to which the user is not currently a member.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

As described above, in at least one example, the user interface 144 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different workspaces. That is, in some examples, the third region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 150 presents data associated with multiple workspaces, at least some data can be associated with an indication of which workspace the data is associated with.

For example, in FIG. 2, the user (e.g., User F), can interact with the user interface 144 to view data associated with the virtual space corresponding to "mentions and reactions." In FIG. 2, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user (e.g., User F) in a message, represented by the indicator 212 (e.g., a user interface element, object, etc.), which is associated with a communication channel (e.g., #ChannelD). The user (e.g., User F) also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 150. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user (e.g., User F) in a message, represented by the indicator 216 (e.g., a user interface element or object), which is associated with a communication channel (e.g., #ChannelK). As such, the indicator 216 can be presented in the third region 150. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 150 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 144 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 144 is a non-limiting example of a user interface that can be presented via the user computing device 104 (e.g., by the application 140). In some examples, the application 140 can receive data from the workspace management component 116 and/or channel management component 118 and the application 140 can generate and present the user interface 144 based on the data. In other examples, the application 140 can receive data from the channel management component 118 and instructions for generating the user interface 144 from the workspace management component 116 and/or channel management component 118. In such an example, the application 140 can present the user interface 144 based on the instructions. Additional or alternative data can be presented via a user interface and additional or alternative configurations can be imagined.

Figure 3A:
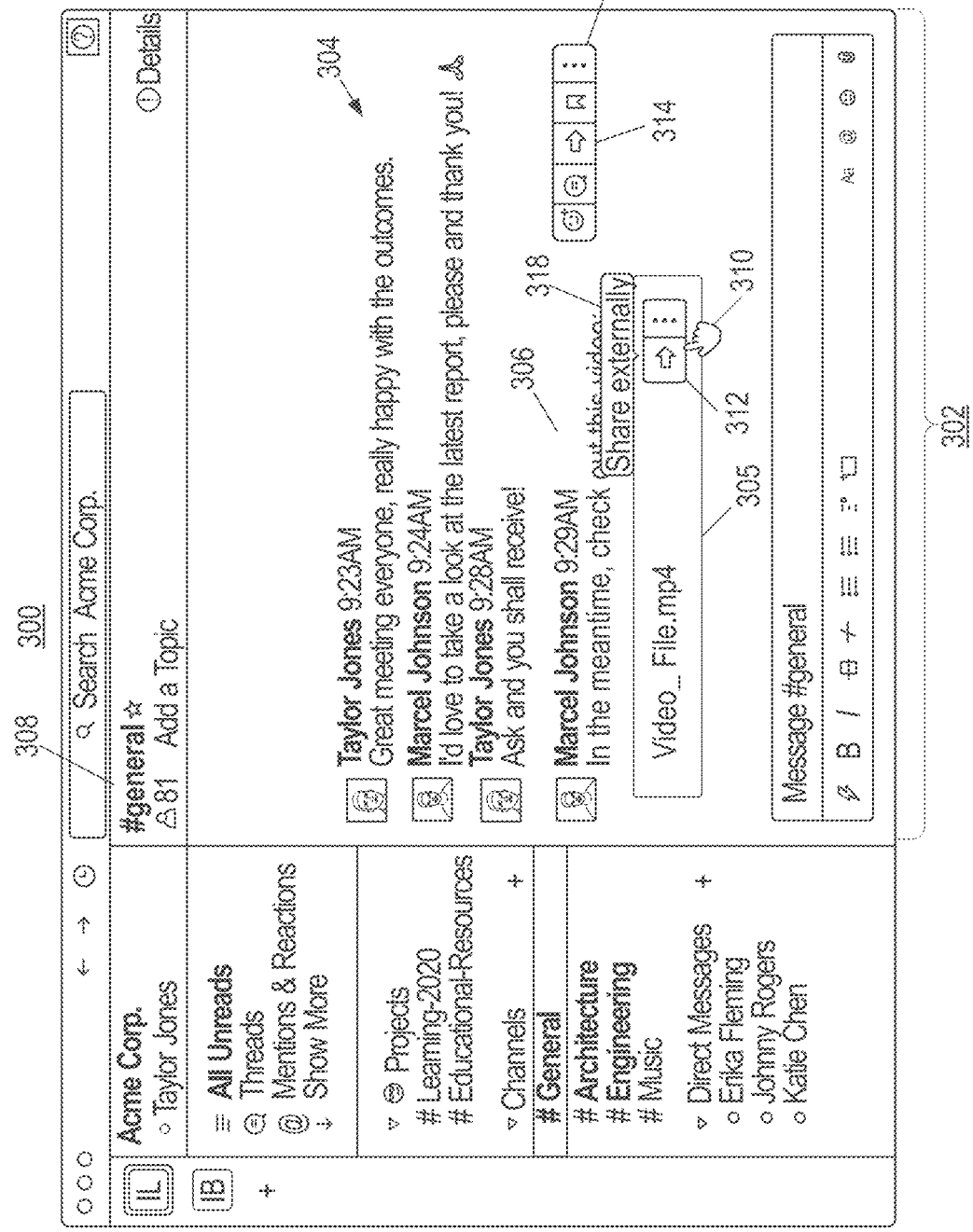
FIGS. 3A and 3B illustrate an exemplary user interface of a group-based communication system for allowing a user to share content externally.
Figure 3B:
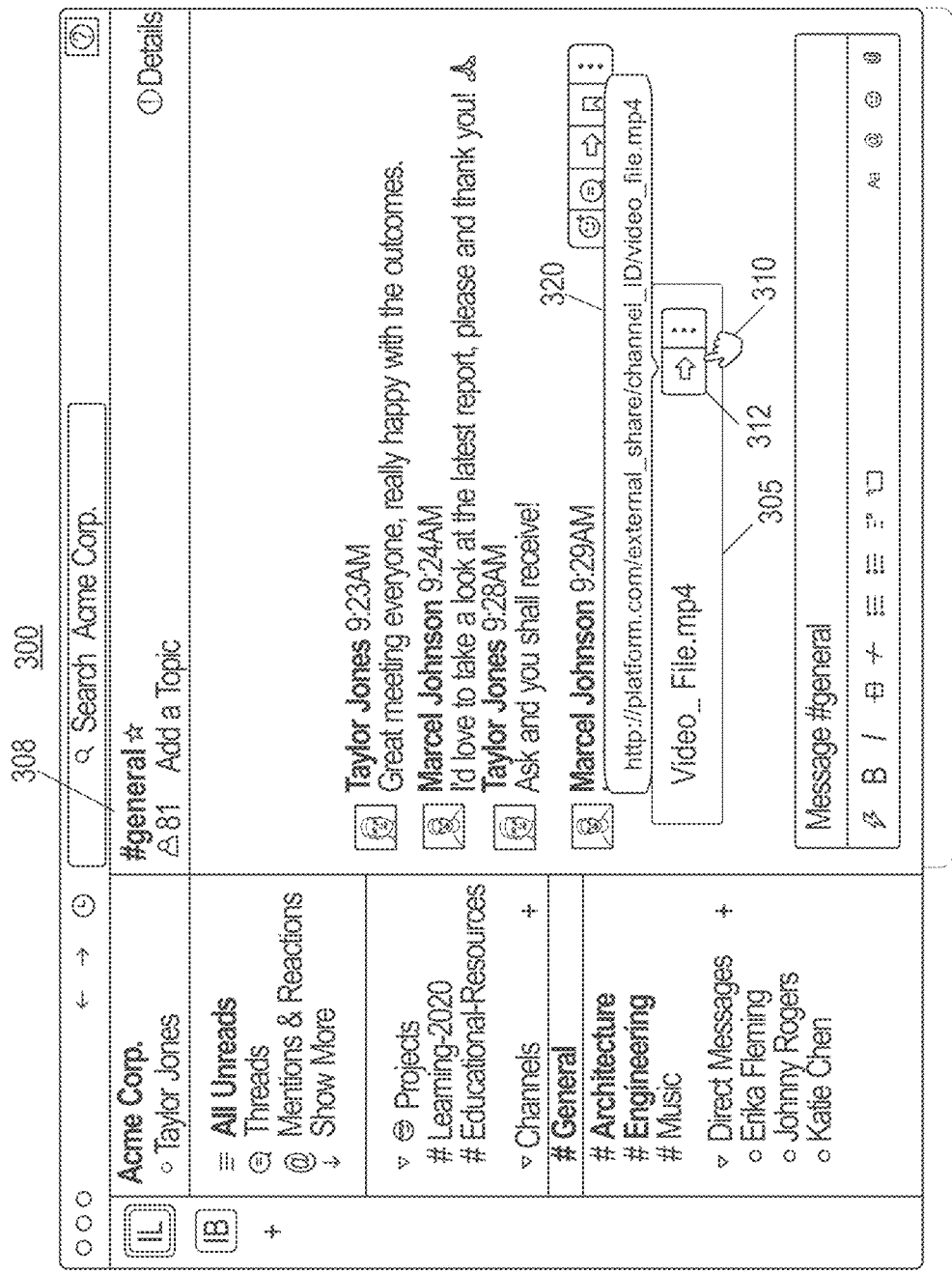

FIGS. 3A-B illustrate an exemplary user interface 300 of a group-based communication platform that enables content posted to a group-based communication channel to be shared externally of the channel by a user that has access to the channel, according to various embodiments. User interface 300 can include any of the features discussed above with respect to interface 144 and the discussion of those features is not repeated here for brevity.

Interface 300 includes a message display region 302 that can display one or more messages posted to a communication channel by one or more users that have access to the channel, as discussed above with respect to interface 144. Interface 300 may be provided on the device of a user (e.g., user Taylor Jones) who is member of a channel (i.e., has access to the channel) of the group-based communication platform for accessing content (e.g., messages, emoji, profiles, links to content, images, video clips, audio clips, invitations, documents, other types of files, announcements, etc.) posted by members of the channel. In the illustrated example, user Taylor Jones and fellow channel member Marcel Johnson posted several messages 304 to the channel 308 ("general"), which are displayed to user Taylor Jones in the message display region 302 of the interface 300.

The user may desire to share content that has been posted to the channel outside of the channel such that non-channel members may access the content. For example, in the illustrated example, the user Taylor Jones may desire to share a message 306 posted to the channel 308 by a channel member (e.g., Marcel Johnson) and/or a video file 305 posted within the message 306. To do so, the user may provide an input associated with the content that the user desires to share externally, such as via a click or hover input using cursor 310 associated with message 306 or video file 305. According to some embodiments, in response to the user input, a content share affordance may be displayed, such as affordance 312 associated with video file 305 or affordance 314 in menu 316 associated with message 306. In some embodiments, in response to a user input (e.g., hover or click) associated with the content share affordance, a tool tip 318 may be displayed to indicate that the user may share the content externally. The user may provide an input indicating a desire to share the content externally, such as by selecting the content share affordance 312.

According to various embodiments, in response to the user selecting the content share affordance 312, the group-based communication platform may generate a link to the content for the user to share outside of the channel and/or outside of the group-based communication platform. For example, as shown in FIG. 3B, a link 320 (e.g., a URL) to the video file 305 may be generated and displayed in the interface 300. The user may select the link 320 (or the link may be automatically copied to the user's clipboard or otherwise provided to the user) and provide the link to non-channel members in any suitable manner, such as by emailing the link, posting the link to a website, texting the link, posting the link to an external messaging service (external to the group-based communication platform).

In some embodiments, the content may not be shareable and the content share affordance 312 may not be shown or may be grayed out (or otherwise visually altered) to indicate that the content is not shareable. In some embodiments, the content may be shareable only after specific permission is granted and selection of the content share affordance 312 may enable the user to request to share the content, which may route a share approval request to a group administrator.

Figure 4B:
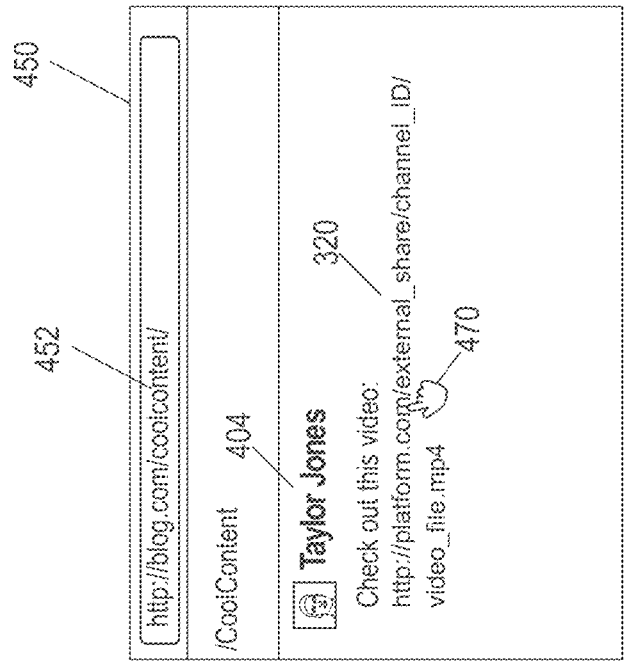
FIGS. 4A and 4B illustrate exemplary methods for providing a shareable link to content within a channel to users outside of the channel, according to various embodiments.
Figure 4A:
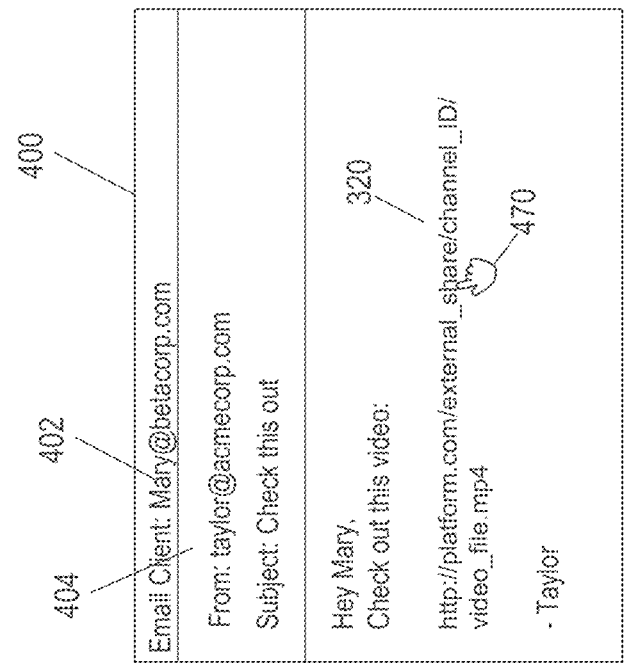

FIGS. 4A and 4B illustrate examples of a user sharing a link to content posted within a channel of a group-based communication platform to one or more non-channel members using a system that is external to the group-based communication platform, according to various embodiments. FIG. 4A illustrates a conventional email message 400 received by a non-channel member 402 from a channel member 404 via an email system. The message 400 includes the link 320 to the content (e.g., video file 305 of FIG. 3A) posted within the channel. FIG. 4B illustrates a post 450 to an external communication platform 452 in which the channel member 404 posted the link 320 to the content.

A user may use the link provided by the channel member to request the linked content from the group-based communication platform. For example, the user may select the link 320 in the email 400 or blog post 450 (e.g., click via cursor 470) and a web client or other application of the user's device may communicate with the group-based communication platform to access the content. According to various embodiments, a user selection of the link via the user's device results in the user's device sending a request to the group-based communication platform for access to the linked content.

Upon receiving the request for access to the linked content, the group-based communication platform may parse the request to determine the requested content. For example, the link 320 may include information for identifying the channel from which the link originated (e.g., "channel_ID" in link 320) and the content requested (e.g., "video_file.mp4" in link 320). In some embodiments, the group-based communication platform may request additional information from the user prior to providing the requested content. For example, a login option may be provided to the user to enable the user to log into the platform in the event the user is a member of the platform or a member of the group. According to some embodiments, in response to a login from a channel-member (e.g., a channel member used a link posted by another channel member in an external communication platform), the group-based communication platform may determine that the user is a member of the channel from which the content originated and may direct the user to the content within the channel in the workspace of the user within the platform (e.g., via interface 144). According to some embodiments, in response to a login from a user who is a member of the platform but not a member of the channel (or workspace, organization, or other group) from which the requested content originated, the platform may determine that the user is a member of the platform but not a member of the group from which the requested content originated and may provide the requested content within a platform user interface for the user (e.g., interface 144). In some embodiments, no login option may be provided to the user or the user may choose to bypass any login attempt (or failed login) and the user may be provided access to the content, such as discussed below.

Figure 5A:
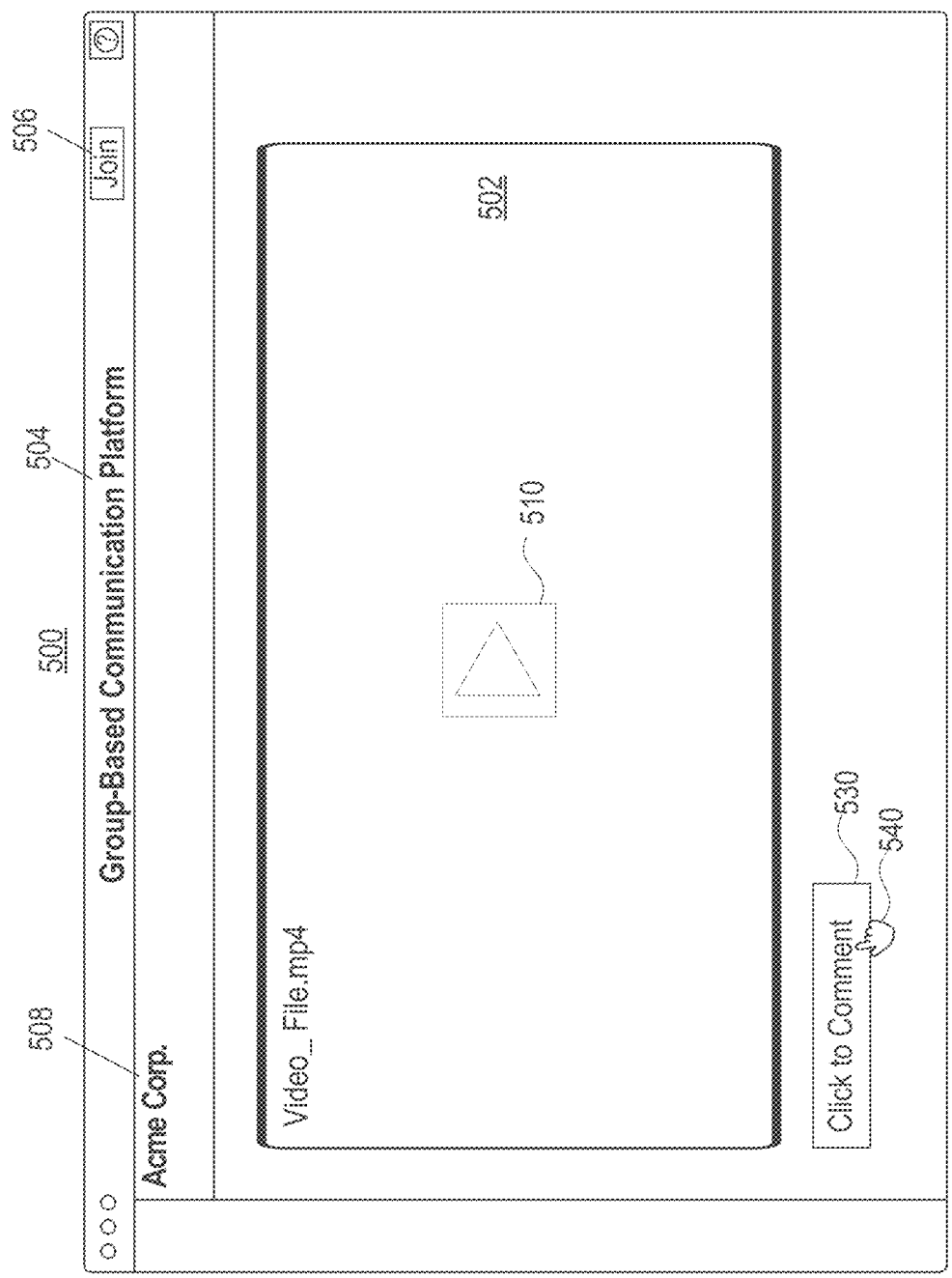
FIGS. 5A and 5B illustrate an exemplary user interface for displaying shared content, according to various embodiments.

According to various embodiments, in response to a request for content via a shared link, the group-based communication platform may transmit information for rendering a user interface on the requesting user's device within which the requested content is displayed. FIG. 5A illustrates an exemplary user interface 500 that may be generated for displaying the requested content to on a device of the user. Interface 500 may be rendered on the device in any suitable fashion, such as via a web browser, within a mobile application, etc.

The interface 500 renders the content 502 (e.g., "Video_File.mp4") that was posted within the channel of the group-based communication platform and shared externally by a member of the channel. Thus, a user can view the content posted in the channel of the group-based communication platform without having access to the channel itself.

According to various embodiments, the interface 500 does not display any content posted in the channel other than the linked content. For example, with reference to FIGS. 3A and 3B, where the video file 305 was shared, only the video file 305 is viewable by the non-channel member and not other content such as messages 304 or message 306. According to some embodiments, where a channel member shares a message that includes additional content (e.g., message 306 is shared and message 306 includes video file 305), the shared message alone may be displayed to the non-channel member in interface 500 or the shared message and its included content may be displayed to the non-channel member in interface 500.

According to various embodiments, the user can view the content within the interface 500 (e.g., the user may view the Video_File.mp4 by selecting the play button 510) but may not otherwise interact with the content. For example, the user may not download the content or comment on the content within the interface 500. In some embodiments, the user can provide input associated with the content in the interface 500. For example, the user can provide a comment associated with the content or an emoji reaction to the content. According to various embodiments, input associated with the content (e.g., a comment) may be provided to group members within the group interface (e.g., within message region 302 of interface 300).

Figure 5B:
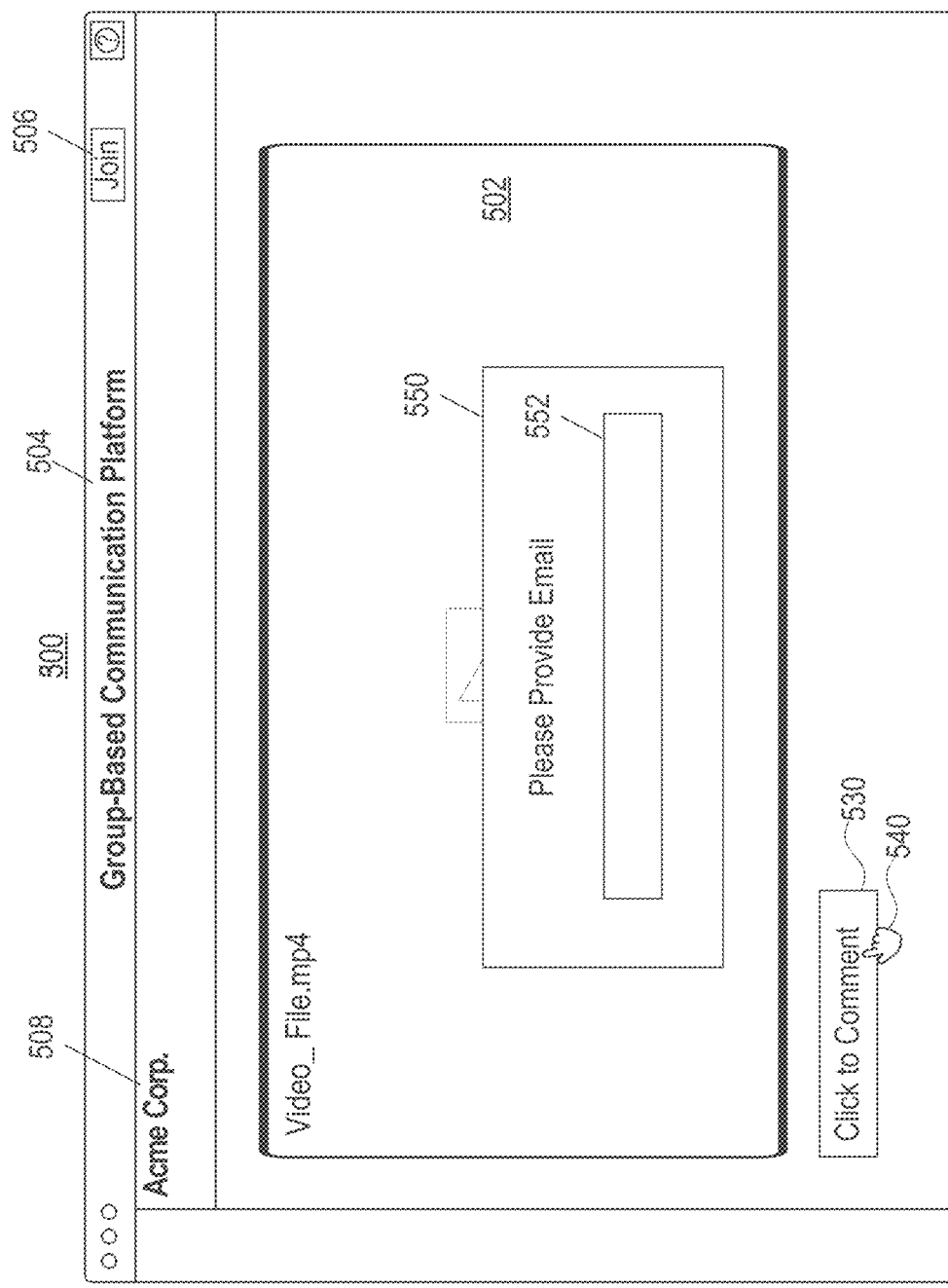

In some embodiments, the interface 500 may include a graphical object 530 that may indicate to the user the ability to comment on (or otherwise interact with) the content. In some embodiments, in response to a user request to comment via the graphical object 530 (e.g., via click by cursor 540), the user may be permitted to comment. In other embodiments, the user may be provided with a process for gaining permission to comment. For example, as shown in FIG. 5B, the user may be prompted (e.g., via pop-up object 550) to provide an email address (e.g., in field 552) or other identifying information. In some embodiments, identification information may be a gating parameter for the ability to interact with the content (beyond viewing the content). For example, only those meeting certain identify criteria (e.g., from the same organization or predefined white-listed organization) may be permitted to comment. In other embodiments, the identification information not a gating factor in commenting (beyond whether or not the identification information is provided) but, rather, a means for tracking users. In some embodiments, an identification process for verifying identification information that the user provides may be used to confirm the identification information, such as an auto-generated email sent to the email address provided by the user that has a verification code. In some embodiments, a request to comment is routed to a group administrator for granting permission to comment (or otherwise interact with content or channel associated with the channel).

According to various embodiments, the interface 500 may include an indication 504 that may advertise the group-based communication platform to the user, which may help bring new users to the group-based communication platform. According to some embodiments, the interface 500 may include a user interface object 506 that enables the non-group member to initiate a process for joining the group-based communication platform. In some embodiments, the interface 500 may include an indication 508 associated with the group or organization with which the channel is associated, which may advertise the group or organization associated with the channel to users requesting the content.

Figure 5C:
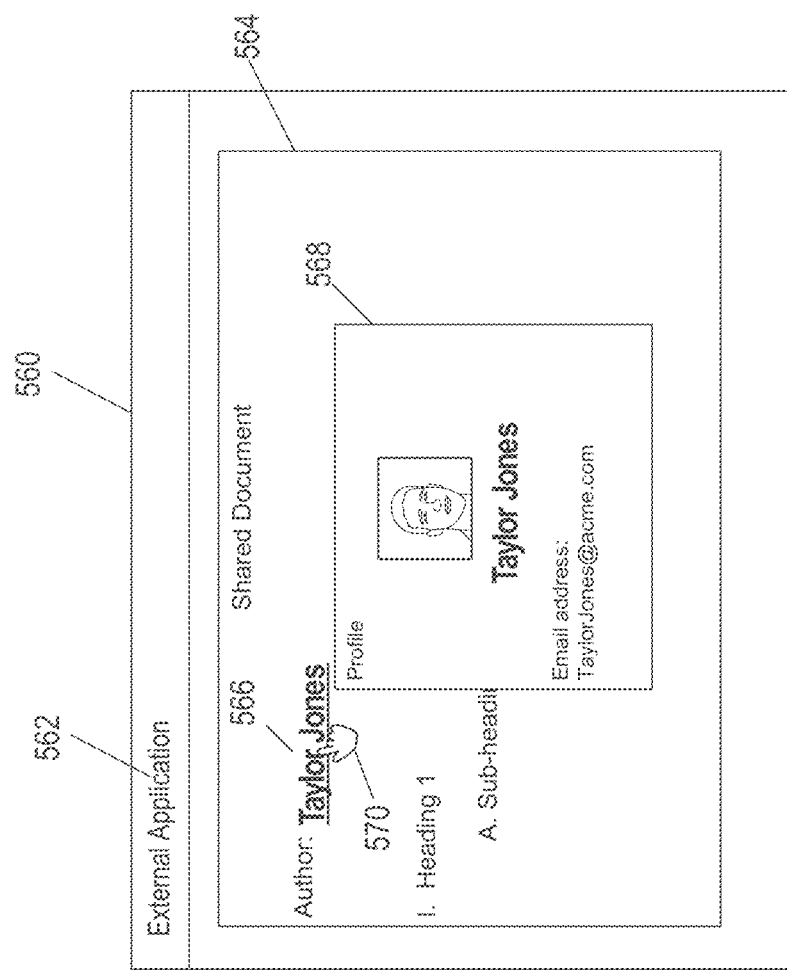
FIG. 5C illustrates an exemplary user interface of an integrated external application for displaying a preview of shared content, according to some embodiments.

In some embodiments, at least a portion of the linked content may be previewed in an external application that is integrated with the group-based communication platform. FIG. 5C illustrates an exemplary user interface 560 of an external application 562 in which linked content (a group-based communication platform user profile in this example) can be previewed within the external application 562. External application 562 is integrated with the group-based communication platform such that linked content may be previewed within the external application 562, which enables a user of the integrated external application to view at least a portion of the content without having to leave the external application. In the illustrated example, external application 562 is a document creation/editing application in which a shared document 564 has been created by external application user Taylor Jones, who is also a member of the group-based communication platform and included an embedded link 566 to his group-based communication platform profile.

A second external application user may view a preview 568 of Taylor Jones's group-based communication platform profile within the interface 560, such as via a click or hover (e.g., via cursor 570) on Taylor Jones's name in the document, which includes the embedded link 566. In some embodiments, the second user may be required to be logged into the external application 562 (e.g., with credentials to view and/or edit the document 564) to preview the linked content. According to various embodiments, the second user may request to access the full linked content and may be directed to a group-based communication platform interface, such as discussed above with respect to FIGS. 5A and 5B. In some embodiments, a preview of the linked content may be provided in response to a first user input (e.g., a hover on the embedded link 566) and the full linked content may be provided in response to a second user input (e.g., click on the embedded link 566 or click on the profile preview 568).

According to various embodiments, any type of content may be previewed within an integrated external application, such as any of a message, an emoji, an image, a video, an audio file, an invitation, a document, a file, an announcement, etc. For example, a link to a video posted in a group-based communication platform channel may be embedded within the integrated external application and a preview of the linked video (e.g., the first few seconds or one or more snippets of the video) may be displayed in the external application, or a link to a document posted in a group-based communication platform channel may be embedded within the integrated external application and a preview of the document (e.g., the page) may be displayed in the external application. According to various embodiments, the ability to preview linked content within an integrated external application may depend on the external application and type of linked content. For example, message, an emoji, a profile, a link, an image, a video, an audio file, an invitation, a document, a file, and an announcement In some embodiments, at least a portion of the group-based communication channel to which the linked content was posted may be displayed along with a preview of the linked content in the external application, such as to provide context of the linked content. For example, one or more messages associated with the linked content in the group-based communication channel may be displayed along with the content preview in the external application. To further illustrate, where the linked content was posted in a message thread in the group-based communication channel, at least a portion of the thread may be included in the display of the linked content in the external application. In some embodiments, including at least a portion of the group-based communication channel to which the linked content was posted along with the linked content in the external application may be an optional setting that may be set by the user creating the link and/or by a group administrator.

Figure 6:
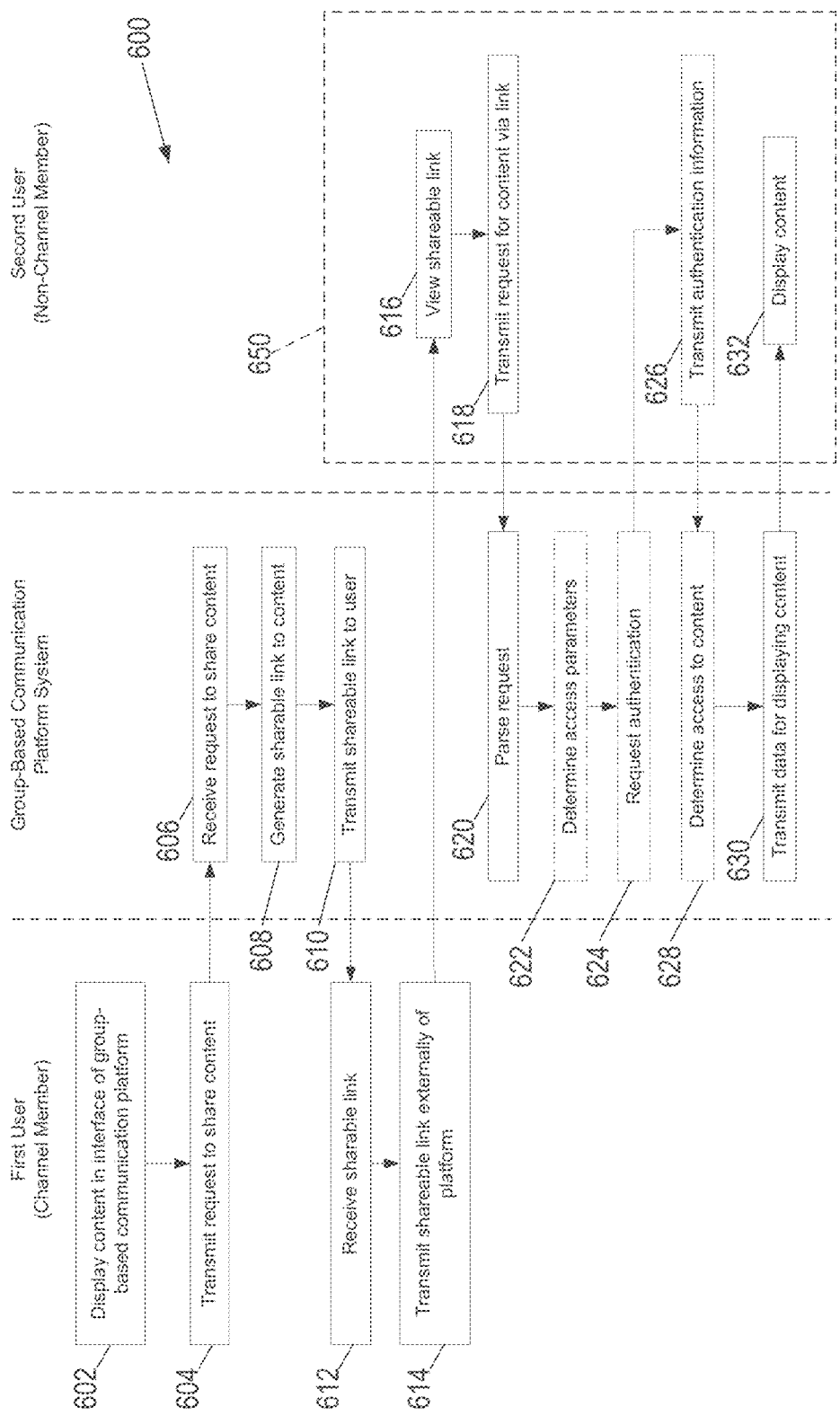
FIG. 6 illustrates a method for sharing content, according to various embodiments.

FIG. 6 illustrates a method 600 for providing content posted within a channel of a group-based communication platform to users who are not members of the channel, according to various embodiments. Method 600 may be performed by one or more portions of a group-based communication platform, such as one or more portions of environment 100 of FIG. 1. Method 600 may be performed at least partially on one or more user computing device, such as user computing device 104 of FIG. 1. In some embodiments, method 600 is performed at least in part by user computing device 104 in communication with one or more servers 102 of FIG. 1.

According to various embodiments, method 600 may be performed for sharing content outside of the channel within which it is posted but within the group-based communication platform. For example, content from a channel may be shared with others within the same workspace or with others outside of the workspace but still within the group-based communication channel. In some embodiments, method 600 may be performed for sharing content outside of the group-based communication platform altogether.

At step 602, content is displayed within an interface associated with a channel of a group-based communication platform on a first user device associated with a member of the group-based communication channel. Content can be any information shared between members of a channel via the channel, such as one or more messages, emoji, profiles, links, images, video clips, audio clips, invitations, documents, other files, announcements. Content may be displayed, for example, within a portion of an interface (e.g., message display region 302 of interface 300 of FIG. 3A) that includes messages exchanged between members of the channel. The content may be displayed via a graphical object representing the contents of the object, such as a graphical object that has a name (e.g., a file name) of a document, video file, audio file, etc., or a graphical object that includes partial display of the content, such as display of an image or portion of an image, display of a frame of a video file, display of a portion of a document, etc. According to various embodiments, the content may be provided to the user device by a group-based communication platform server based on a request to view content associated with the group. For example, the user device may transmit a group ID and user ID to the server and based on the group ID and user ID the server may transmit data to the user first device for displaying the content on the first user device.

At step 604, the first user device transmits a request to the group-based communication platform server indicating the first user's desire to share content outside of the group-based communication platform. For example, the first user may provide an input (e.g., a click or hover) associated with the content displayed within the group-based communication platform interface on the user's device and, in response, the user may be provided with an option to request a link to share the content outside of the group-based communication platform. The user may select the option to request the link and the request may be transmitted to the group-based communication platform server in response. According to various embodiments, any content posted to a channel may be shared according to method 600. In some embodiments, content may not be shareable or may not be shareable by the particular user and the user may not have the ability to request a shareable link (e.g., a link requesting user interface object may not be provided or may be disabled).

At step 606, the group-based communication platform server receives the request from the first user device to share the content outside of the group-based communication platform. At step 608, in response to receiving the request from the first user device, the group-based communication platform server may generate a link to the first content for sharing outside of the group-based communication platform. The link may be, for example, a URL that can be used to request the content from the group-based communication platform from an external system (i.e., external to the platform). In some embodiments, the ability to share content may be dependent upon the user making the request, such as due to group or channel settings. As such, the group-based communication platform may not provide the shareable link for users that are not permitted to externally share content or permission may be required before the link will be provided. For example, different organizations of a shared channel may have different permissions for externally sharing content. In some embodiments, content may be externally shared by only members of a subset of organizations of a shared channel. In some embodiments, content may be externally shared by a user that is a member of the same organization as the user that posted the content.

At step 610, the group-based communication platform may transmit the link to the first user device. The link may be displayed on the first user device for selection and/or may be automatically copied to a clipboard of the first user device at step 612.

According to various embodiments, at step 614, the first user may provide the link for use by one or more users to access the content from outside of the channel (e.g., by a user who does not have access to the channel). In some embodiments, the link is provided to users outside of the group-based communication platform (i.e., the requesting user does not have to be logged into the group-based communication platform). According to various embodiments, the first user may provide the link in any manner in which the user can share digital information. For example, the first user may email the link, text the link, post the link via a social media application, incorporate the link in a document, calendar event, etc. According to various embodiments, the link may be used multiple times by multiple users. For example, a user may receive the link, such as in an email or via a social media feed, and may forward the link to another user or post the link for use by other users.

A step 616, a second user who is not a member of the group from which the content was shared can view the link provided by the first user. For example, the second user may receive an email containing the link or may see the link on a social media post. In some embodiments, the link may be embedded within a graphical object that the user may select. For example, where the linked content is a video, a graphical object indicating that the linked content is a video may be displayed and may include an embedded link for requesting the content.

At step 618, the second user transmits a request to the group-based communication platform server for access to the content associated with the link. For example, the user may click the link or an object within which the link is embedded or may copy and paste the link into a web browser of the second user device.

At step 620, the group-based communication platform parses the request to determine one or more attributes associated with the request that enable the server to determine what content is requested and whether and/or how the content may be delivered to the requestor. The request may include information for identifying the content and the channel where the content is posted. For example, the platform may query a database that associates externally shareable content links with the linked content based on information provided in the request. In some embodiments, the server may parse the request to extract information associated with the source of the request, such as a domain, a software application transmitting the request, a geographic location of the user device, and/or user identification information.

In some embodiments, method 600 may include optional step 622 in which the group-based communication platform server determines one or parameters for granting access to the requested content. The one or more parameters can include settable access parameters associated with a channel (or workspace to which the channel belongs) that define how widely content within a given group or channel may be shared. The settable access parameters may be set, for example, by a group or workspace administrator or may be default settings that can be changed by a group or workspace administrator. A settable access parameter could be, for example, that content may or may not be shared outside of the channel such that when a request is received for content from a channel in which external sharing is not permitted, the request may be denied, but when the request is for content from a channel in which external sharing is permitted, the content may be provided to the requestor.

In some embodiments, one or more access parameters may be associated with a source of a request such that the request is handled based on the source of the request. For example, one or more access parameters may define access permissions that are based on the source of the request, such as a source domain, a source software application, a source geographic location of the requestor, and/or requesting user identification information.

In some embodiments, content may be externally shared to only certain external applications (such as defined by an administrator) and step 622 may include determining whether a permitted application may be requesting access to the content. In some embodiments, access to content may be based on the type of content and the external application, such that only a certain type of content may be shared to a particular application. For example, a document may be shared to an external document processing application but not to a video sharing application.

In some embodiments, the platform may request additional information from the requestor prior to granting access to the requested content in optional step 624. For example, the platform may request user authentication and/or may request information associated with the source of the request (e.g., a handshake between the platform and a request source platform). In some embodiments, the user and/or request source platform/system may provide the requested information in optional step 626. For example, the user may provide a username and password, an email address, or other authenticating information.

In some embodiments, the platform server may determine whether and/or how to grant access to the content at optional step 628. In some embodiments, the determination may be made based on information provided in the original request, such as one or more of a source domain, a source software application, or a source geographic location and may be based on the access parameter(s) for the channel that are determined at step 622. For example, the platform server may determine that a request originating from a first domain defined as permitted by the access parameters for the respective channel should be granted but a request originating from a second domain that is not permitted by the access parameters for the respective channel should be denied or requires the user to authenticate.

In some embodiments, the determination is made based on user authentication, such as provided in step 626. For example, a user may be authenticated as being a user of the platform and/or a user of an authorized third-party and may be granted access to the content based on access parameters for the respective channel that define platform and/or third-party users as being permitted to access the content.

In some embodiments, access to the content may be granted by a group administrator. For example, a requesting user may provide identification information that may be routed to an administrator of the channel for approval before granting access to the content within the channel.

In some embodiments, the platform server may determine the manner in which the content is provided to the user based on channel access parameters and/or source information. For example, at a lowest level of access, the content alone may be provided to the requestor, such as in a simple user interface for providing content to external users. At higher level of access (e.g., to a user that belongs to a workspace or an organization that includes the channel but that is not a member of the channel), the requestor may be granted access to the channel to freely comment on the content and/or post additional content to the channel. For example, a channel may be defined as open to members of another workspace or organization within the platform and a requestor that authenticates as a member of the workspace or organization may be granted full access to the channel. In some embodiments, a requestor may be granted access to the content and permission to comment on the content but may be restricted from viewing other content within the channel interface and/or posting content to the channel other than in association with the content. In some embodiments, where a requestor is authenticated as a platform user, the user may be provided with a platform interface associated with the user (e.g., including the user's workspace(s) and/or channels) and the requested content may be provided in a user interface region associated for viewing shared content (e.g., a share channel).

In some embodiments, access to content from a shared link may be based on elapsed time since the link was generated. For example, access to content may be denied where a request is received via a link generated more than a predetermined number of days prior (e.g., 30 days) to the request. Expiration of a link may be a default parameter or a settable parameter. For example, a group administrator and/or the group member sharing content can set the expiration time period applied to all links or applied to a particular link.

At step 630, the group-based communication platform server transmits data for displaying the content to the second user device. For example, the group-based communication platform server may provide information for generating a user interface associated with the group-based communication platform to the second user device. In some embodiments, the requested content is provided to the second user device directly in response to the request. For example, where the requested content is an image, the image may be provided to the second user device for display and where the requested content. In some embodiments, the information provided to the second user device may include one or more user interface objects for the user to request to view the content. For example, where the shared content is a video clip, information may be provided to the second user device for rendering a video player and an indication of the requested content within the video player, such as a first frame of the video. The user may then provide an input (e.g., to a play button) to view the content. In some embodiments, the content is downloadable by the second user device (i.e., for saving in its entirety on the second user device) and in other embodiments, the content may be non-downloadable (e.g., streaming audio or video, display of one page of a document at a time, etc.).

At step 632, the content is displayed on the second user device based on the information provided by the group-based communication platform server. In some embodiments, the content is displayed in a user interface associated with the platform, which can be advantageous, for example, to advertise the platform to users who may not be on the platform. In some embodiments, the interface may provide information associated with the channel from which the content was shared, such as an organization name, group name, group member name, etc. In some embodiments, the user interface may enable the second user to share the content without having to use the original link. For example, an affordance may be displayed for the user to select to request a shareable link to the content. This may be useful, for example, where the second user has navigated away from the link that the second user used to access the content. A shareable link may be provided to the second user and the second user may use the link to share the content to others in similar fashion to steps 604 through 632.

In some embodiments, where the second user is a member of the group-based communication platform, the content is displayed to the user in an interface of the group-based communication platform for the user (e.g., having the user's channels, workspaces, contacts, messages, etc.). In some embodiments, the second user is added as a member to the channel where the content originated. In some embodiments, the second user may be added to the originating channel in response to a request from the second user (e.g., a user input to graphical object 530 of FIG. 5A). In some embodiments, the user is added after being granted permission from an administrator of the channel.

In some embodiments, steps 618 through 632 (which may or may not include optional steps 622 to 628) may be performed for displaying a preview of the content to the requestor. For example, the requestor may provide an input associated with the link, such as a hover associated with the link and a portion of the content may be displayed to the user without the user being directed away from the user interface containing the link. For example, the link may be embedded within a video user interface object and a user hover over the object may result in a first few seconds of the video being played to the user via steps 618 through 632. Should the user desire to view the full content, the user may select the link or a graphical object within which the link is embedded and may be directed a platform user interface for viewing the full content.

In some embodiments, the preview of the linked content is provided by an external application 650 that is integrated with the group-based communication platform, such as discussed above with respect to FIG. 5C. Steps 616, 618, and 632 (and, optionally, step 626) can be performed by the external application 650 for displaying a preview of the linked content to the second user within the external application 650. For example, the shareable link may be viewed within a user interface of the external application 650 (e.g., user interface 560 of external application 562 of FIG. 5C) on the second user's device at step 616 and a request to preview the content may be transmitted by the external application at step 618 (e.g., in response to a hover on embedded link 566 of FIG. 5C). Steps 620-630 (which may include optional steps 522-628) may be performed as discussed above. At step 632, a preview of the content is displayed to the second user within the external application (e.g., preview 568 of FIG. 5C). In some embodiments, the second user can provide a request to view the full content and steps 618 through 632 (which may or may not include optional steps 622 to 628) can be performed for providing the full content within an interface of the group-based communication platform (e.g., interface 500 of FIGS. 5A and 5B).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A computer-implemented method comprising:
transmitting first data for displaying first content within a first interface of a group-based communication channel of a group-based communication platform on a first user device associated with a member of the group-based communication channel;
receiving a first request from the first user device to share the first content outside of the group-based communication platform;
in response to the first request from the first user device, automatically generating a link to the first content for sharing outside of the group-based communication platform;
transmitting the link for display within the first interface of the group-based communication channel on the first user device based on the receiving the first request from the first user device, the link configured for sharing by a first user of the first user device with one or more other users comprising at least a second user of a second user device, the first user corresponding to the member of the group-based communication channel;
receiving a second request to view the first content from the second user device, wherein the second user of the second user device is a non-member of the group-based communication channel, and wherein the second request to view the first content originated outside of the group-based communication platform and is associated with the link;
in response to the second request, transmitting second data for displaying the first content within a second interface of the group-based communication platform on the second user device based at least in part on:
the second request being associated with the link,
the second user being the non-member of the group-based communication channel, and
the second user being a member of the group-based communication platform; and
receiving a third request from the second user device to interact with the first content and, in response to receiving the third request to interact with the first content, transmitting third data for displaying an authentication prompt for the second user associated with the second user device to authenticate.

2. The method of claim 1, further comprising, in response to receiving the second request to view the first content from the second user device and prior to transmitting the second data for displaying the first content within the second interface of the group-based communication platform on the second user device, requesting approval from an administrator of the group-based communication channel.

3. The method of claim 1, wherein the second request to view the first content comprises information indicating a source of the second request and the method further comprises determining whether to display the first content on the second user device based on the information indicating the source.

4. The method of claim 3, wherein the information comprises at least one of a domain, a geographic location, or a software application.

5. The method of claim 1, wherein the one or more other users further comprises at least a third user of a third user device, the method further comprising:
- receiving a fourth request to view the first content from the third user device, wherein the third user of the third user device is a non-member of the group-based communication platform, and wherein the fourth request to view the first content originated outside of the group-based communication platform and is associated with the link; and
- in response to the fourth request, transmitting fourth data for displaying the first content within an application on the second user device based at least in part on the fourth request being associated with the link, wherein the application is external to the group-based communication platform based at least in part on the third user being the non-member of the group-based communication platform.

6. The method of claim 1, further comprising, in response to the second request, adding the second user to the group-based communication channel.

7. The method of claim 6, wherein the second interface of the group-based communication platform is associated with the group-based communication channel based at least in part on the adding the second user to the group-based communication channel.

8. The method of claim 1, wherein the second interface of the group-based communication platform is unassociated with the group-based communication channel based at least in part on the second user being the non-member of the group-based communication channel.

9. A group-based communication system comprising one or more processors, memory, and one or more programs stored in the memory and configured to be executed by the one or more processors, wherein the one or more programs include instructions for:
- transmitting first data for displaying first content within a first interface of a group-based communication channel of a group-based communication platform on a first user device associated with a member of the group-based communication channel;
- receiving a first request from the first user device to share the first content outside of the group-based communication platform;
- in response to the first request from the first user device, automatically generating a link to the first content for sharing outside of the group-based communication platform;
- transmitting the link for display within the first interface of the group-based communication channel on the first user device based on the receiving the first request from the first user device, the link configured for sharing by a first user of the first user device with one or more other users comprising at least a second user of a second user device, the first user corresponding to the member of the group-based communication channel;
- receiving a second request to view the first content from the second user device, wherein the second user of the second user device is a non-member of the group-based communication channel, and wherein the second request to view the first content originated outside of the group-based communication platform and is associated with the link;
- in response to the second request, transmitting second data for displaying the first content within a second interface of the group-based communication platform on the second user device based at least in part on:
  - the second request being associated with the link,
  - the second user being the non-member of the group-based communication channel, and
  - the second user being a member of the group-based communication platform; and
- receiving a third request from the second user device to interact with the first content and, in response to receiving the third request to interact with the first content, transmitting third data for displaying an authentication prompt for the second user associated with the second user device to authenticate.

10. The system of claim 9, wherein the one or more programs include instructions for: in response to receiving the second request to view the first content from the second user device and prior to transmitting the second data for displaying the first content within the second interface of the group-based communication platform on the second user device, requesting approval from an administrator of the group-based communication channel.

11. The system of claim 9, wherein the second request to view the first content comprises information indicating a source of the second request and the one or more programs include instructions for determining whether to display the first content on the second user device based on the information indicating the source.

12. The system of claim 11, wherein the information comprises at least one of a domain, a geographic location, or a software application.

13. The system of claim 9, wherein the one or more other users further comprises at least a third user of a third user device, and wherein the one or more programs include instructions for:
- receiving a fourth request to view the first content from the third user device, wherein the third user of the third user device is a non-member of the group-based communication platform, and wherein the fourth request to view the first content originated outside of the group-based communication platform and is associated with the link; and
- in response to the fourth request, transmitting fourth data for displaying the first content within an application on the second user device based at least in part on the fourth request being associated with the link, wherein the application is external to the group-based communication platform based at least in part on the third user being the non-member of the group-based communication platform.

14. A non-transitory computer-readable storage medium storing one or more programs, the one or more programs comprising instructions, which when executed by one or more processors of a computing system, cause the computing system to:
- transmit first data for displaying first content within a first interface of a group-based communication channel of a group-based communication platform on a first user device associated with a member of the group-based communication channel;
- receive a first request from the first user device to share the first content outside of the group-based communication platform;
- in response to the first request from the first user device, automatically generate a link to the first content for sharing outside of the group-based communication platform;
- transmit the link for display within the first interface of the group-based communication channel on the first user device based on the receiving the first request from the first user device, the link configured for sharing by a first user of the first user device with one or more other users comprising at least a second user of a second user device, the first user corresponding to the member of the group-based communication channel;

receive a second request to view the first content from the second user device, wherein the second user of the second user device is a non-member of the group-based communication channel, and wherein the second request to view the first content originated outside of the group-based communication platform and is associated with the link;

in response to the second request, transmit second data for displaying the first content within a second interface of the group-based communication platform on the second user device based at least in part on:
- the second request being associated with the link,
- the second user being the non-member of the group-based communication channel, and
- the second user being a member of the group-based communication platform; and receive a third request from the second user device to interact with the first content and, in response to receiving the third request to interact with the first content, transmit third data for displaying an authentication prompt for the second user associated with the second user device to authenticate.

15. The non-transitory computer-readable storage medium of claim 14, wherein the one or more programs comprise further instructions, which when executed by the one or more processors of the computing system, cause the computing system to: in response to receiving the second request to view the first content from the second user device and prior to transmitting the second data for displaying the first content within the second interface of the group-based communication platform on the second user device, request approval from an administrator of the group-based communication channel.

16. The non-transitory computer-readable storage medium of claim 14, wherein the second request to view the first content comprises information indicating a source of the second request and the one or more programs comprise further instructions, which when executed by the one or more processors of the computing system, cause the computing system to: determine whether to display the first content on the second user device based on the information indicating the source.

17. The non-transitory computer-readable storage medium of claim 16, wherein the information comprises at least one of a domain, a geographic location, or a software application.

* * * * *